J. BLAUSTEIN.
CALCULATING MACHINE.
APPLICATION FILED DEC. 2, 1918.

1,370,493.

Patented Mar. 1, 1921.
5 SHEETS—SHEET 1.

WITNESS:
Howard P. King

INVENTOR:
Joseph Blaustein,
BY
Russell M. Everett,
ATTORNEY.

J. BLAUSTEIN.
CALCULATING MACHINE.
APPLICATION FILED DEC. 2, 1918.
1,370,493.
Patented Mar. 1, 1921.
5 SHEETS—SHEET 4.
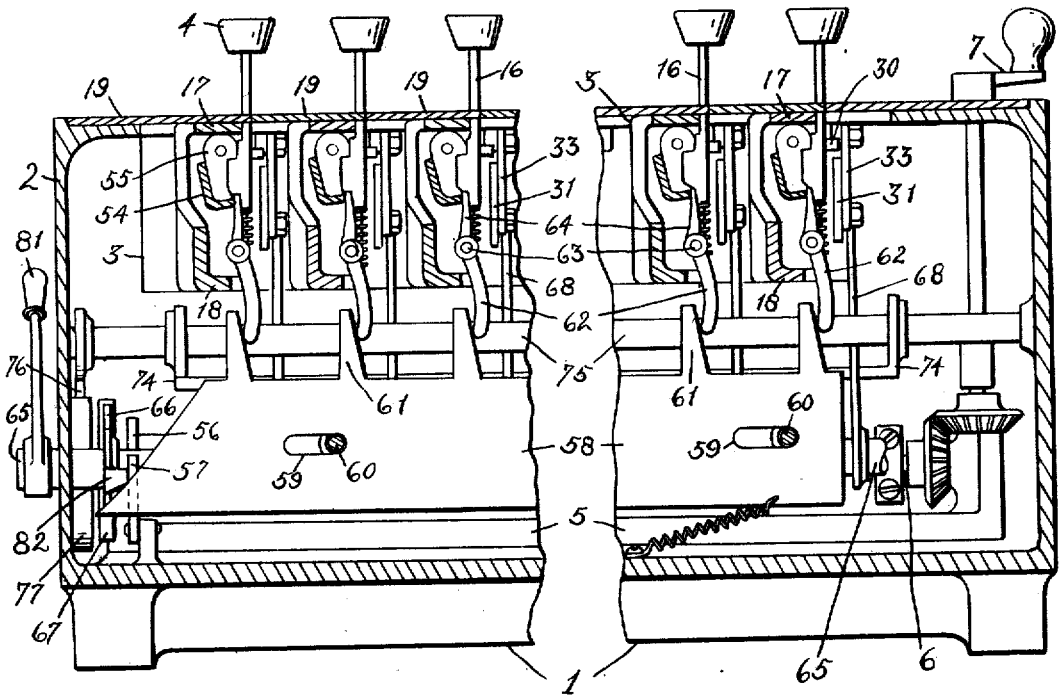
Fig. 6.
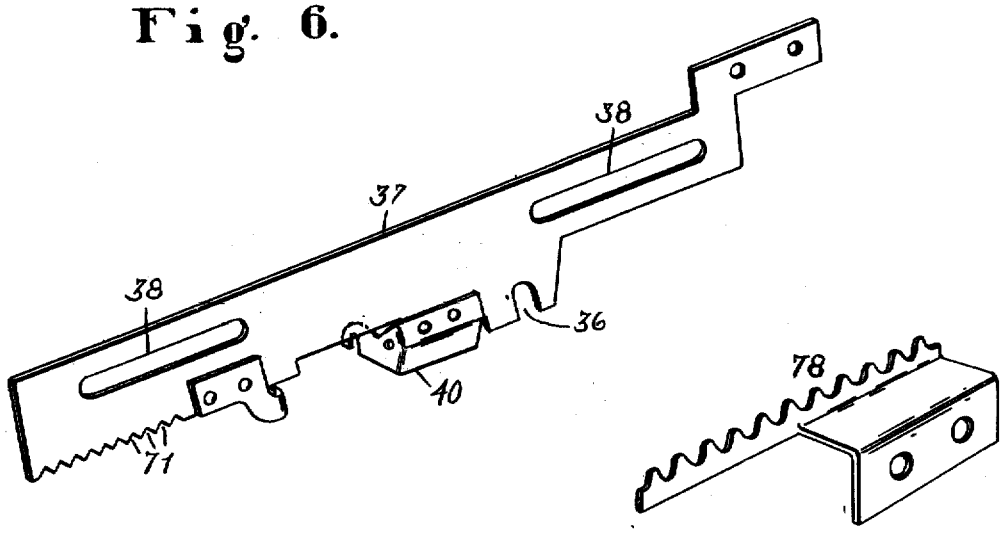
Fig. 4.
Fig. 5.
WITNESS:
Howard P. King
INVENTOR:
Joseph Blaustein,
BY
Russell M. Everett,
ATTORNEY.

UNITED STATES PATENT OFFICE.

JOSEPH BLAUSTEIN, OF NEWARK, NEW JERSEY, ASSIGNOR TO THE CONTROLLER COMPANY, INCORPORATED.

CALCULATING-MACHINE.

1,370,493.      Specification of Letters Patent.     Patented Mar. 1, 1921.

Original application filed April 20, 1917, Serial No. 163,348. Divided and this application filed December 2, 1918. Serial No. 264,901.

*To all whom it may concern:*

Be it known that I, JOSEPH BLAUSTEIN, a citizen of the United States, and a resident of Newark, in the county of Essex and State of New Jersey, have invented new and useful Improvements in Calculating-Machines, of which the following is a specification.

This invention relates to that class of calculating machines in which disks having parallel axes are used and keys are employed for setting the machine for successive operations through sliding setting gears to be variably actuated by step gears, such machines being known as the Thomas type. The present application is a division of my application Serial No. 163,348 filed April 20, 1917, and more especially it relates to the key-setting mechanism by which the members to be combined are set up in the operation of the machine to perform the desired calculation.

The objects of the invention are to secure accurate and positive action, quietness and ease of operation; to provide for each row of keys a swinging plate adapted to be operated by any one of them to actuate the setting gear; to combine with said swinging plate a sliding plate in translating the vertical movement of the keys into movement at right angles thereto; to actuate a checking device or set-up-figure wheel directly from said sliding plate; to provide a swinging bar for holding a key depressed and for releasing that key when another is depressed or when the cycle of operation is finished; to enable said bar to provide a single edge for engagement with all the keys in the row; to provide improved means for automatically releasing said bar from the keys at the completion of an operation of the machine; to also provide erasing means operable either by hand or automatically for returning the swinging plate and slide plate to initial position; to secure a construction of sections one for each row of keys any one of which sections can be removed without removing either of the next adjacent sections; to at the same time secure a compact construction in which the rows of keys shall be near together; to secure a construction which can be economically and advantageously manufactured and in which the various parts are accessible for examination or adjustment, and to secure other advantages and results as may be brought out in the following description.

Referring to the accompanying drawings, in which like numerals of reference indicate the same parts throughout the several views, Figure 1 is a plan view of a portion of a calculating machine embodying my invention, showing parts broken away and in section;

Fig. 4 is a detail perspective view of a certain slide plate;

Fig. 5 is a detail perspective view of a rack normally carried by said slide plate, but shown independent thereof;

Fig. 6 is a longitudinal cross-sectional view taken upon a plane just inside the front wall of the machine and looking toward the back of the machine;

In said drawings, 1 indicates the base of the machine, 2 the walls of a casing built up on said base to contain the working parts, and 3, 3, etc., indicate sections of the upper part of the casing which carry each a row of setting keys 4. It will be understood that these sections extend from front to rear as the machine stands before the operator, each carrying keys with numerals from 1 to 9, and that there are as many sections in a series from right to left of the machine as may be necessary to give the machine its desired range of numbers.

Figure 1:
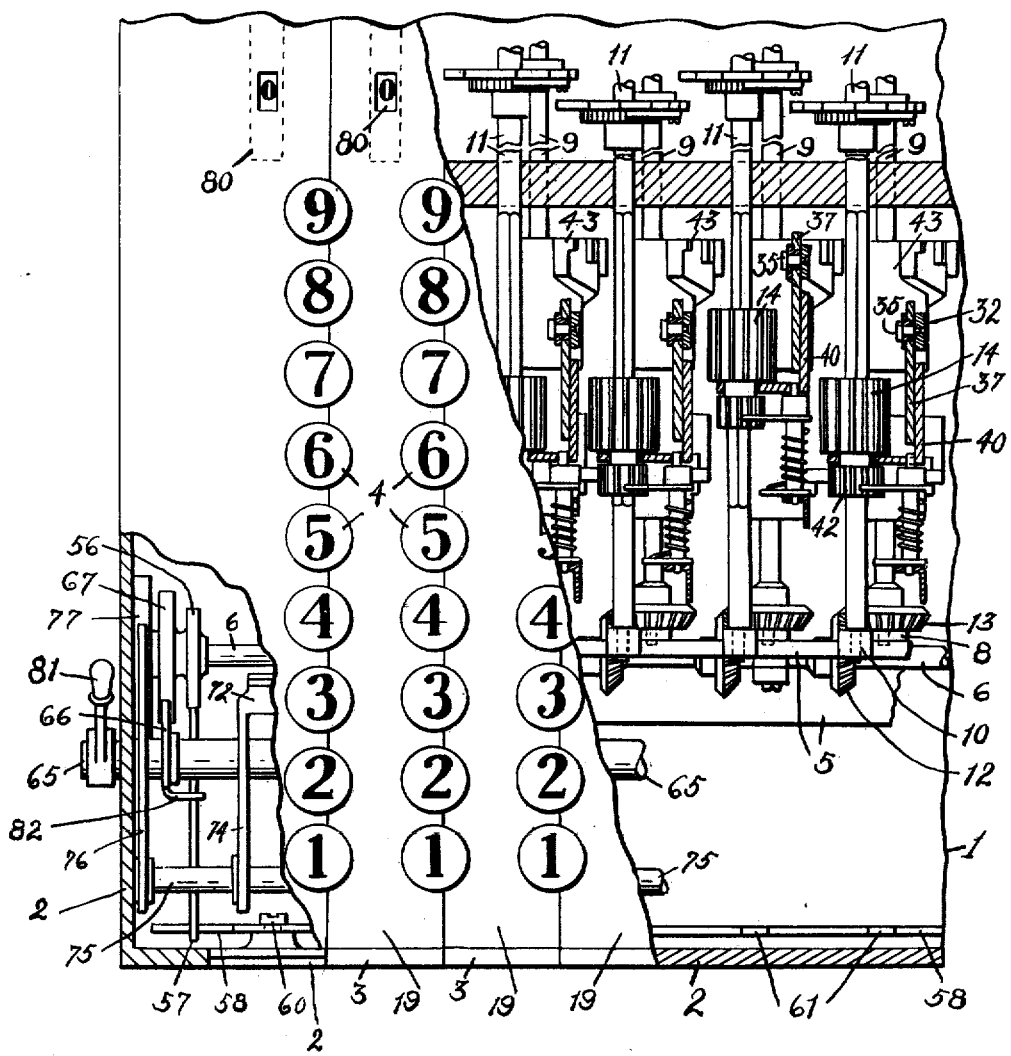
Figure 2:
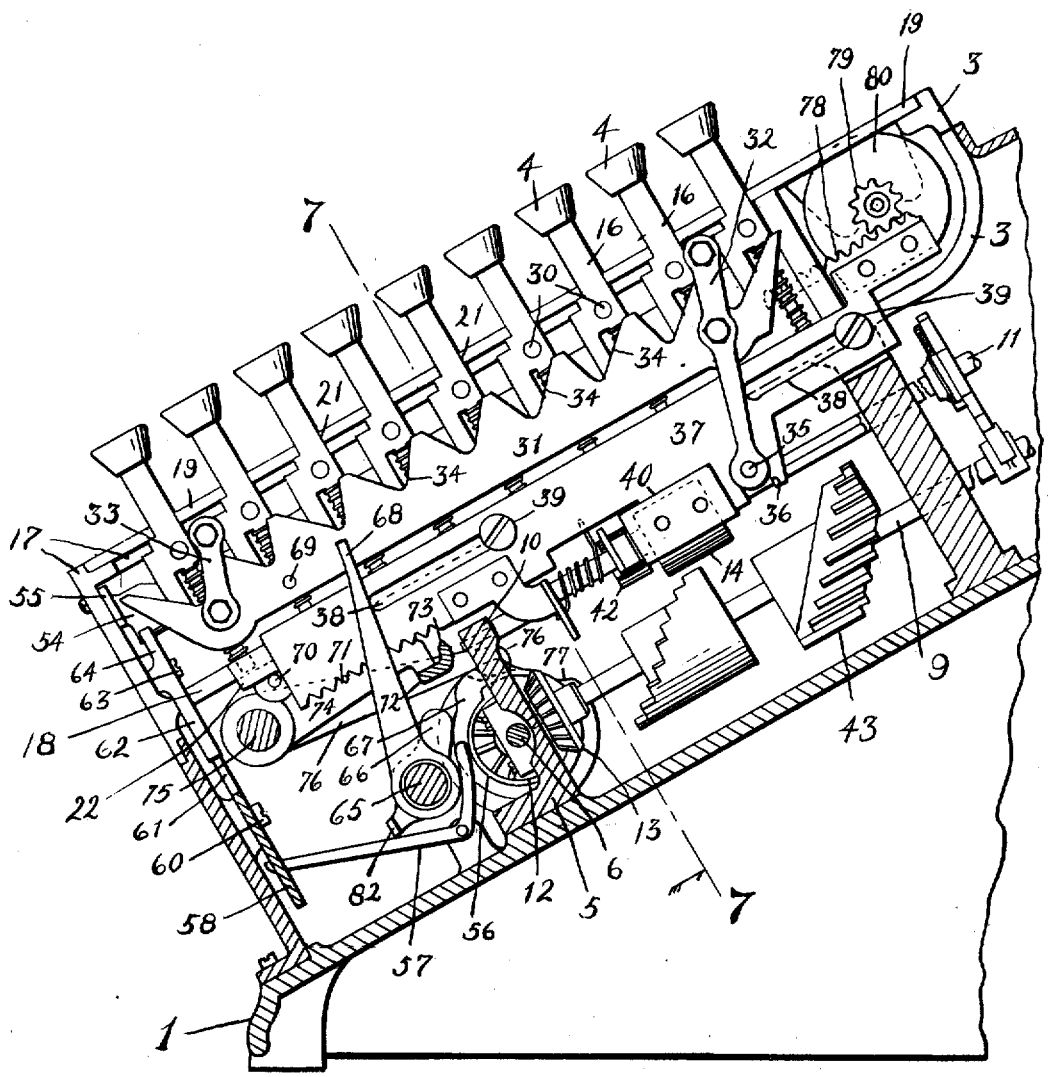
Fig. 2 is a transverse vertical section of the machine showing a row of keys all in normal position.
Figure 3:
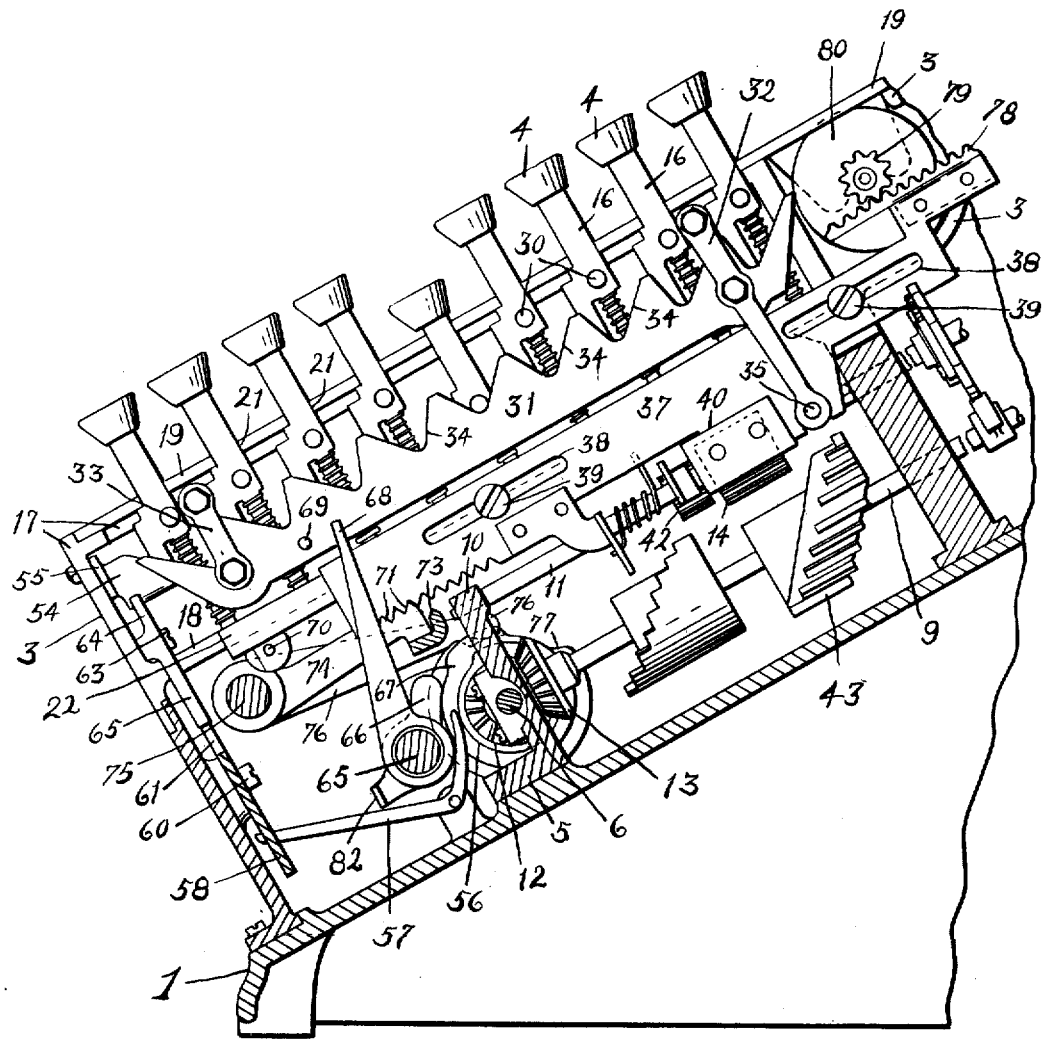
Fig. 3 is a similar cross-sectional view showing one of the keys depressed.

Secured to the bottom or floor of the casing and standing edgewise therein is a casting 5, see Figs. 1, 2 and 3 especially, which extends from right to left of the operator and in which is journaled a shaft 6 longitudinally of the casting and adapted to be rotated as desired by a crank 7, as shown in Fig. 6, at the right-hand end of the machine, to operate the machine in calculating. Said casting 5 also provides lower bearings 8 for step gear spindles 9 and upper bearings 10 for setting gear spindles 11, see Fig. 1, which spindles extend rearward from the casting to operate the calculating and registering mechanism. There is one of each of said spindles for each section 3 of the machine and each step gear spindle is connected to the shaft 6 by bevel gears 12, 13. It is to the means for operating the setting gears 14 by means of the keys 4, preliminary to turning the crank 7 to actuate the calculating mechanism, that the present invention more particularly relates and which will next be described.

The setting keys 4 project from the tops of the sections 3, see Figs. 1, 2, 3, 6 and 7, and are slidably mounted in said sections whereby they may be depressed. Preferably said keys, as shown in Fig. 8, are stamped out of sheet metal and provide each a foot 15 at its inner or lower end and a shank 16 at its outer or upper end, both said foot and shank extending longitudinally of the key, by means of which the key may be mounted to slide longitudinally of itself. The casting or frame work of each section 3 provides a top piece 17 and a bottom bridge 18 spaced apart in substantially parallel relation, see Figs. 2, 3, 6 and 7, and flatwise upon the top piece is secured a top plate 19, said top plates of adjacent sections being contiguous at their edges so as to close the top of the machine, as shown in Fig. 1. A slot 20 is cut in the edge of the bridge and a slot 21 is cut in the corresponding edge of the top plate for each of the keys, the shank 16 of the key riding in the slot of the top plate and the foot 15 of the key riding in the slot of the bridge of the casting. A strip 22, secured to the edge of the bridge outside of the keys, holds the feet 15 thereof within their slots, and the adjacent top plate 19 holds the shank portions of the keys in their respective slots. In this manner, the keys are slidably held so as to be free to move up and down, and preferably a spring 23 is provided to normally slide each key upwardly, as shown, said spring being placed upon the foot 15 and bearing at its lower end against the bridge 18 and at its upper end against a downwardly facing shoulder 24 at the upper end of the foot 15. Between the upper end of the foot and the lower end of the shank of the key, the material is extended laterally in the plane of the foot and shank, as at 25, and at the outer end of this lateral extension the material is bent on a line parallel to the foot and shank into a plane substantially perpendicular to that of the extension, providing thereby a portion 26 for purposes hereinafter described. At the bottom of said bent portion 26 and sloping upwardly toward its free edge is a downwardly facing shoulder 27, and at the top of said bent portion is an upwardly facing shoulder 28. It is to be understood that the keys of any one row are positioned all at one side of that section 3, and the bent portion 26 projects inwardly of the section beneath the top piece 17 of the casting and the top plate 19. A stop 29 is provided on the key, preferably at one edge of the same, to engage the under side of the plate 19 and accurately limit upward movement of the key. Each key has at its side opposite from the bent portion 26, that is, projecting away from the section 3, a pin 30, adapted when the key is depressed to engage a swinging plate 31 and operate the same.

This swinging plate (see Figs. 2 and 3 particularly and also Fig. 7) lies in edgewise position longitudinally of the section just outside the keys 4, being suspended by links 32, 33 outside the plate near its opposite ends and which are pivoted to the top piece 17 of the casting or frame of the section. At its upper edge said swinging plate 31 has recesses the rear walls 34 of which are inclined upwardly rearward and adapted to be engaged each by one of the keys 4 or pins 30 thereon, so that as any key is depressed the swinging plate will be swung endwise accordingly but will always remain parallel to its first position. These rear walls 34 incline differently, each from the others, so that the plate will be swung more or less according to the key which is pressed. As shown in the drawings, the wall 34 nearest the front of the machine which will be engaged by the first or front key slopes the least, that is, is inclined only slightly out of parallel relation to the direction of movement of the key, whereas the inclined wall for the last key has the greatest slope, and all of the intermediate rear walls slope more and more from the first to the last. By this means, the swinging plate will be moved a predetermined distance by any one key, and the distance it is moved will be different for each key of the row.

The link 32 at the rear end of the swinging plate 31 extends downward beyond said plate and is provided with a lateral pin 35 which enters a slot 36 extending upwardly from the lower edge of a slide plate 37, see Figs. 1, 2, 3 and 4 especially, said slide plate preferably lying in the same plane with the swinging plate 31, and having longitudinal slots 38, 38 near its upper edge to receive stationary screws 39 projecting from the bridge 18 of the section casting and upon which the plate can slide. The front end of this slide plate projects forwardly over the casting 5 and back of said casting the lower edge of the slide plate is in proximity to and parallel to the setting gear spindle 11. The slide plate carries an arm 40, see Figs. 1, 2 and 3, transverse to the plate and extending beneath the section, adapted to engage and slide a setting gear 14 upon its spindle 11. In the drawings, engagement of this arm with the setting gear is shown effected by positioning the arm in an annular slot between said setting gear 14 and a locking gear 42 also movable with the setting gear, so that the arm 40 will move the setting gear longitudinally of its spindle as the slide plate 37 moves, and carry said gear a greater or less distance according to which key is depressed. It is to be understood that a step gear 43 is fast upon the corresponding step gear spindle 9, adapted to engage and turn the setting gear through a greater or less arc, dependent upon the relative position of said setting gear longitudinally of its spindle, and thus turn said spindle. The manner of doing this and of preventing rotation of the setting gear spindle otherwise is fully set forth and described in my prior application above referred to, of which the present application is a division, and need not be detailed here.

Figure 7:
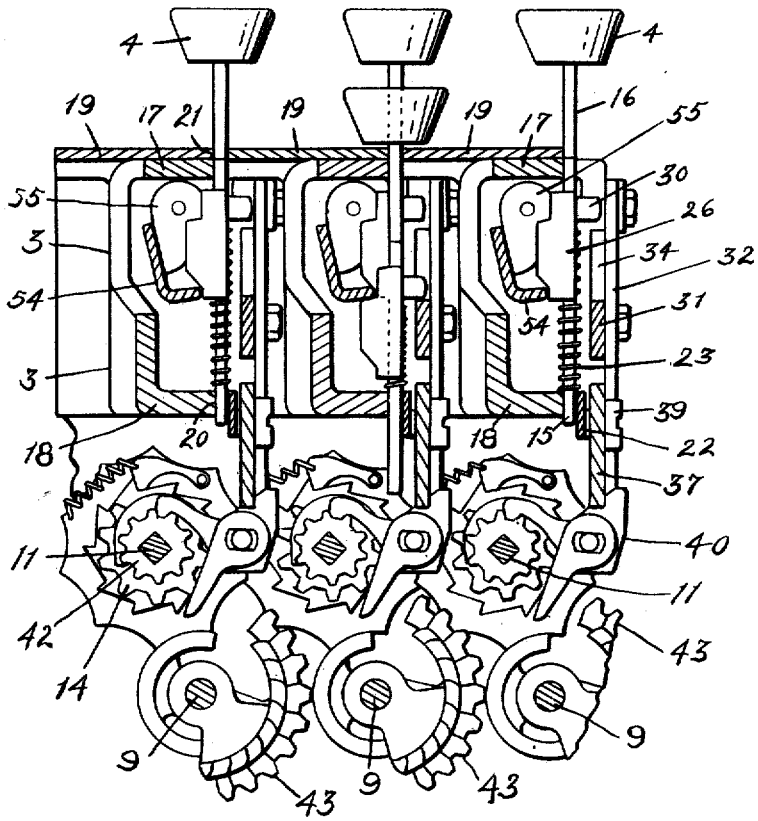
Fig. 7 is a sectional view on line 7—7 of Fig. 2, showing one of the keys in depressed position.
Figure 8:
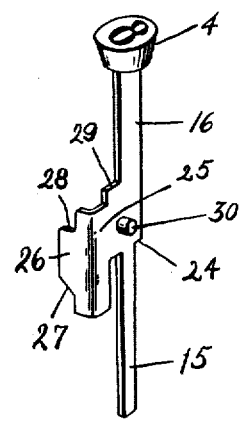
Fig. 8 is a detail perspective view of one of the keys.
Figure 9:
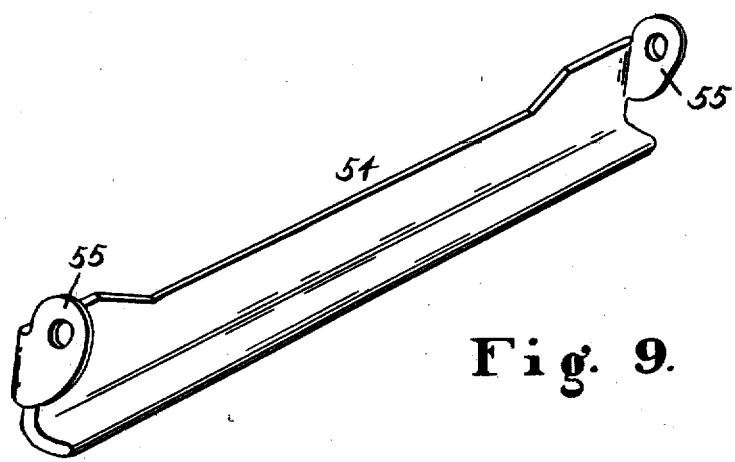
Fig. 9 is a detail perspective view of a certain locking bar for the keys.

In order to hold any key of a row depressed, and to utilize the depression of that key to release any other key previously depressed in that row, a swinging lock bar 54, see Figs. 9 and 7, extends longitudinally of the section adjacent the row of keys at the side thereof toward which the bent portions 26 of the keys project. This locking bar is pivoted adjacent its ends to swing bodily away from the keys, and as shown is made in a sort of angle-iron cross-section with one flange projecting toward the keys and the other flange provided with ears 55, 55 by means of which the bar is pivoted to the opposite ends of the section casting or frame. The flange projecting toward the keys is adapted to normally underlie the lower or downwardly facing sloping shoulders 27 of all the keys, so that depression of any key will swing the bar. Further depression of the key brings its upwardly facing shoulder 28 below said flange of the bar, so that the bar may then swing in toward the keys again and hold that one depressed. Should another key of that row thereafter be depressed, the bar is swung outward by the second key, thereby releasing the first one and permitting it to return to its initial position. It will be understood that this locking bar swings with very little friction and thus presents minimum resistance to depression of the keys.

Means are provided for swinging all the locking bars 54 of the machine after the setting of the registering mechanism, that is to say, near the end of the revolution of the crank 7, so as to release any keys which have been depressed, preparatory to pressing again for a further calculation, and for this purpose I have shown upon the shaft 6, see Figs. 1, 2, 3 and 6, a cam 56 which operates a bell crank lever 57 so as to slide from left to right of the machine a comb 58 mounted upon the front wall of the casing, as by slots 59, 59 receiving screws 60, 60. This comb has at its upper edge teeth 61 adapted to engage the lower arms of levers 62 pivoted as at 63 one upon each casing section and swing said levers so that their upper arms 64 will push the locking bars 54 away from the keys to release said keys and permit their springs to throw them into upper or normal position. Any other suitable mechanism may be employed for thus releasing all the keys at the proper time, ready for setting up a new number, however.

In conjunction with the release of the keys, and correspondingly timed therewith, I desire to have some erasing means operate positively to restore the swinging plate 31 to normal position, and for this purpose I have shown a shaft 65 extending from right to left of the machine preferably just forward of the shaft 6 and provided with an arm 66 adapted to be engaged at the proper moment by a cam 67 on said shaft, see Figs. 1, 2, 3 and 6. This rocks the shaft 65 so that arms 68 fast upon the shaft, one for each section, will engage each a pin or projection 69 upon a swinging plate 31 and return them all to normal or zero position. Preferably such normal position is determined by means of a stop 70 upon the section casting or frame adapted to engage the end of the slide plate 31, see Figs. 2 and 3. In case it should be desired to erase without any operation of the machine by its crank 7, the shaft 65 projects outside the casing, as shown in Figs. 1 and 6, and receives a hand lever 81 by means of which the shaft can be rocked by the operator independently of the operation of the machine by the crank 7. Obviously in this case it is necessary also to swing the locking bars 54 and release the keys, and for this purpose the cam 67 on the shaft 65 has opposite its arm 66 a bent arm 82 which overlies the bell crank lever 57 which operates the comb 58, as clearly shown in Figs. 1 and 2. This insures that when the shaft 56 is rocked by the hand lever 81 the swinging and sliding plates are not only returned to initial position, but also the keys 4 are released and elevated so as to permit such return of the swinging and sliding plates.

In order to accurately aline all the setting gears of the various sections of the machine, each sliding plate 37 is provided at any convenient point, such as the lower edge of its front end, with a series of V-shaped notches 71 one for each of the ten positions which the sliding plate may occupy, see Figs. 2, 3 and 4, and an alining bar 72, see Figs. 1, 2 and 4, extends from right to left of the machine beneath said notches and has a correspondingly tapered upturned edge 73 to enter the same. Said alining bar has arms 74, 74 at its opposite ends which are fastened upon a shaft 75 near the front of the machine and journaled in any suitable bearings upon the casing. Said shafts 75 is also provided with an arm 76 which extends rearwardly and is adapted to engage a cam wheel 77 upon the shaft 6, said cam wheel being arranged and adapted to throw the arm 76 upward soon after the shaft 6 begins to turn and hold it upward until shortly before the shaft stops. This causes the alining bar to enter whichever notches of the slide plates of the various sections are over it, as determined by the positions which the slide plates have assumed under the controlling influence of the keys, and thereby aline the slide plates and thus the setting gears with absolute accuracy, holding them so during the operation or until the alining bar is again lowered.

The end of each slide plate 37 toward the back of the machine may carry a rack 78, as shown in Figs. 2, 3 and 5, which engages a gear wheel 79 connected to a setting-up-figure wheel 80, so as to display through sight holes in the top plate 19 numbers corresponding to those for which the keys have been depressed and thus check the accuracy of the operation.

It is to be particularly noted in my improved construction, that by removing the top plates on opposite sides of its row of keys, any section 3 may be lifted out of the machine, thus saving the tedious labor of removing all of the sections from one side of the machine to the one desired in order to remove it, as is customary in most of the present types of machines. As there are no parts supported partly from the section casting and partly from the base, removal of the section does not affect adjustments in any of the parts, nor will any parts be liable to damage by failure to loosen them before attempting to remove the section.

In operation, the sliding plate 37 and swinging plate 31 of each section are initially at their forward or zero position, see Fig. 2. The number to be used in the calculation may then be set up by pressing the proper key in each row to its inner position, see Fig. 3. Depression of the key engages its laterally projecting pin 30 with the inclined rear wall 34 of the swinging plate 31, and continued depression of the key causes said plate to swing in its own plane longitudinally of the row of keys. Depression of the key also engages the sloping downwardly facing shoulder 27 thereof with the swinging locking bar 54, the key thereby pushing the bar aside and holding it thus swung until the key is entirely depressed to its innermost position, at which time said bar will swing back into its original position and engage above the upwardly facing shoulder 28 of the key and thereby hold the key in its depressed position. The swinging of the plate 31 by the key obviously causes the supporting links 32, 33 to swing also, and the link 32 through its slot and pin connection with the slide plate 37, moves said slide plate rearwardly. By virtue of the progressively increasing slopes of the successive rear walls 34 of the swinging plate, the swinging plate and slide plate are moved further rearwardly by keys nearer the rear of the machine than the front. Therefore, each key will slide the slide plate a predetermined distance different from any of the other keys. By virtue of the arm 40 carried by the slide plate, the setting gear 14 and locking gear 42 are also slid rearwardly upon their spindle 11 and the setting gear positioned in proper relation to the step gear 43 so that upon rotation of said step gear through a full revolution the proper rotation of the setting gear is obtained. It is to be understood that operation of the step gear to turn the setting gear is obtained after the keys have been depressed, by rotation of the crank 7, see Fig. 6, which rotates the shaft 6 and through the bevel gears 12, 13 the step gear spindles 9. As the crank is started to be turned, the cam 77 swings the arm 76 upwardly, thereby lifting the alining bar 72 to engage the same with the notches 71 in the slide plates 37 and very positively and securely position each slide plate so as to obtain accurate alinement of the setting gear with respect to its step gear, the alining bar operating upon all of the slide plates regardless of what key is depressed in any row. Furthermore, the alining bar is held lifted in engagement with the slide plates until near the end of the rotation of the crank, at which time it is permitted to lower and the cam 56 operates upon the bell-crank lever 57, sliding the comb 58 and tripping the swinging lock bars 54 through the agency of the several levers 62. Swinging of these bars permits the springs 23 on such keys as were depressed to actuate said keys outwardly, after which the cam 56 permits the bell-crank to swing back and the locking bars to also swing into their normal position underlying the sloping shoulders of the keys. The other cam 67 will rotate the shaft 65 just after the keys are released and thereby cause the arms 68 to swing forwardly and engage the pins 69 on the several swinging plates 31, pushing them forwardly into their initial or zero positions and obviously sliding the slide plates 37 also back into their zero positions.

In setting up numbers, it will be seen that where one key of a row has been depressed and another key of the same row is afterward depressed this swings the locking bar out again and thereby automatically releases the first key which was depressed and the locking bar will then swing in again to lock the last key down. It may be noted in this connection that the recesses formed in the swinging plates 31 have not only inclined rearward walls 34 but also have inclined front walls converging with respect to the rear walls toward the bottom of the plate, so that the recesses are substantially V-shaped. Since the positive alining is obtained by the alining bar 73 coacting with the slide plates 37, it is not necessary to have any vertical pockets at the bottom of these V-shaped recesses for alining purposes, and consequently any movement of the swinging plate 31 one way or the other will positively force any of the keys upward which are depressed at the time of that movement. For instance, in Fig. 3 one key is shown depressed, and if another key were now to be depressed and for any reason the spring on the one which is depressed failed to force it upward when released by the bar 54, it is obvious that the second key being depressed would move the swinging plate 31 either toward the front or rear of the machine and as a consequence either the front or rear inclined wall of the recess for the depressed key would wedgingly engage the pin 30 thereon and force the key outward. It is therefore not possible in this construction, as occurs frequently in other machines, that two keys within the same section could become accidentally jammed in a half-way position and thus lock the entire mechanism until repairs were effected.

Furthermore, the operator is enabled to check up the number which he sets up by means of the setting-up-figure wheels 80, which display the respective numbers for which the slide plates are set. Obviously, if through some inadvertence a slide plate is moved from its forward position without any key having been depressed, the setting-up-figure wheel will show this, and the operator can remedy the error.

Various modifications and changes may be made in the manufacture of my improved machine without departing from the spirit and scope of the invention, and I do not wish to be understood as limiting myself except as required by the following claims when construed in the light of the prior art.

Having thus described the invention, what I claim is:

1. In a calculating machine, a setting gear, a slide plate for adjusting said setting gear, a swinging plate for operating said sliding plate, means mounting said swinging plate so as to swing endwise in the direction of adjustment of the setting gear, keys adapted to engage said swinging plate to actuate it, and registering mechanism adapted to be actuated by the setting gear.

2. In a calculating machine, a series of keys, a swinging plate coacting with said keys to be variably swung by them, a slide plate receiving motion from said swinging plate, means mounting said swinging plate so as to swing endwise substantially parallel to the slide plate, a setting gear adapted to be adjusted by said slide plate, and registering mechanism adapted to be actuated by the setting gear.

3. In a calculating machine, a setting gear, a sliding plate for adjusting said setting gear, a swinging plate always substantially parallel to a fixed line and adapted to swing endwise, means for transmitting motion from said swinging plate to said sliding plate, keys for actuating said swinging plate, and registering mechanism adapted to be actuated by the setting gear.

4. In a calculating machine, the combination of a setting gear adapted to be slid longitudinally of its axis, a slide plate adapted to move parallel to the axis of said setting gear, a swinging plate connected to said slide plate to slide the same, links pivotally mounting said swinging plate at a plurality of points of its length, a series of keys adapted to engage said swinging plate to variably actuate it, means connecting said slide plate and setting gear to move together, and registering mechanism adapted to be actuated by the setting gear.

5. In a calculating machine, the combination with a setting gear adapted to be slid longitudinally of its axis, and registering mechanism adapted to be actuated by the setting gear, of a slide plate adapted to move parallel to the axis of said setting gear, means connecting said slide plate and setting gear to move together, a swinging plate always substantially parallel to said slide plate and adapted to swing endwise, means connecting said swinging plate and sliding plate to move together, and keys adapted to engage said swinging plate to variably actuate it.

6. In a calculating machine, the combination with a setting gear adapted to be slid longitudinally of its axis, and registering mechanism adapted to be actuated by the setting gear, of a slide plate adapted to move parallel to the axis of said setting gear, means connecting said slide plate and setting gear to move together, a swinging plate parallel to said slide plate, links suspending said swinging plate and connecting it to the slide plate to cause them to move together, and keys for variably swinging said swinging plate.

7. In a calculating machine, the combination with a setting gear adapted to be slid longitudinally of its axis, of a removable section, a swinging plate mounted on the side of said section, a slide plate mounted on said side of the section beneath the swinging plate, means detachably connecting said slide plate to the setting gear to move the same, means connecting said swinging plate and slide plate to cause them to move together, keys mounted in the said section for variably swinging said swinging plate, and registering mechanism adapted to be actuated by the setting gear.

8. In a calculating machine, a row of keys any one of which may be depressed, a longitudinally movable plate adjacent said keys having a plurality of recesses one adjacent each key with its front and rear walls oppositely inclined to the bottom of the recess with respect to the direction of movement of the key, and pins projecting one from each of the keys into the adjacent recess of the plate and adapted upon depression of its key to engage one of the inclined walls of the recess for sliding said plate and remaining so positioned with respect to said inclined wall while the key is held depressed that moving the plate in either direction will tend to lift the key.

9. In a calculating machine, a row of keys any one of which may be depressed, a swinging plate adjacent said keys having a plurality of recesses one adjacent each key with its front and rear walls oppositely inclined to the bottom of the recess with respect to the direction of movement of the key, and pins projecting one from each of the keys into the adjacent recess of the plate and adapted upon depression of its key to engage one of the inclined walls of the recess for sliding said plate and remaining so positioned with respect to said inclined wall while the key is held depressed that swinging the plate in either direction will tend to lift the key.

10. In a calculating machine, a row of keys any one of which may be depressed, means for holding any one key when depressed in such depressed position, a longitudinally movable plate adjacent said keys having a plurality of recesses one adjacent each key with its front and rear walls oppositely inclined to the bottom of the recess with respect to the direction of movement of the key, pins projecting one from each of the keys into the adjacent recess of the plate and adapted upon depression of its key to engage one of the inclined walls of the recess for sliding said plate and remaining so positioned with respect to said inclined wall while the key is held depressed that moving the plate in either direction will tend to lift the key, and means for releasing a depressed key when a second key is pressed.

11. In a calculating machine, a row of keys, a longitudinally movable plate with notches having opposite inclined walls, a projection on each of said keys adapted to engage one inclined wall of a notch to move the plate and remain in such relation thereto that the other inclined wall will engage the projection to force the key upward when the plate is returned or is moved in the opposite direction, and means for automatically returning said plate to initial position near the close of an operation of the machine.

12. In a calculating machine, a row of keys, a longitudinally movable plate with notches having opposite inclined walls, a projection on each of said keys adapted to engage one inclined wall of a notch to move the plate and remain in such relation thereto that the other inclined wall will engage the projection to force the key upward when the plate is returned or is moved in the opposite direction, a swinging lock bar for said row of keys adapted to lock them in depressed position, and coöperating means for releasing said lock bar and for returning said plate to initial position near the close of an operation of the machine.

13. In a calculating machine, a setting gear adapted to be slid longitudinally of its axis, a slide plate adapted to move parallel to the axis of the setting gear, a rack carried by said slide plate, a set-up-figure wheel adapted to display the numeral set up, a pinion engaging said rack, and keys for variably operating said slide plate.

14. In a calculating machine having a casing and a series of setting gears, of a plurality of removable sections, a row of keys mounted in each section, a slide plate mounted on each section and adapted to releasably engage a setting gear and move the same longitudinally of its axis, and means for securing said section to the casing of the machine independently of the others, whereby any section can be removed independently of the others.

15. In a calculating machine having a casing and a series of setting gears, of a plurality of removable sections, a row of keys mounted in each section, a slide plate mounted on each section and adapted to releasably engage a setting gear and move the same longitudinally of its axis, means for securing said section to the casing of the machine independently of the others, and removable top plates one for each section and filling the space between two adjacent rows of keys, whereby upon removing two top plates any section can be removed from the machine.

16. In a calculating machine, the combination with a setting gear, and registering mechanism adapted to be actuated by said setting gear, of a swinging plate capable of swinging endwise in the direction of adjustment of the setting gear for adjusting said setting gear, and keys adapted to engage said swinging plate to operate it.

17. In a calculating machine, a series of keys, a swinging plate coacting with said keys to be variably swung by them, means for mounting said swinging plate so as to swing endwise and always parallel to a fixed line, a setting gear connected to said swinging plate to move therewith, and registering mechanism adapted to be actuated from said setting gear.

18. In a calculating machine, a setting gear, a swinging plate always substantially parallel to a fixed line and adapted to swing in the direction of adjustment of said setting gear, means for transmitting motion from said swinging plate to said setting gear, keys for actuating said swinging plate, and registering mechanism adapted to be actuated by the setting gear.

19. In a calculating machine, a setting gear, a sliding plate for adjusting said setting gear, a swinging plate always parallel to said sliding plate, means for transmitting motion from said swinging plate to said sliding plate, keys for actuating said swinging plate, and registering mechanism adapted to be actuated by the setting gear.

20. In a calculating machine, a setting gear, a sliding plate for adjusting said setting gear, a swinging plate, means holding said swinging plate always substantially parallel to the sliding plate and transmitting motion from said swinging plate to said sliding plate, keys for actuating said swinging plate, and registering mechanism adapted to be actuated by the setting gear.

21. In a calculating machine, a setting gear, a swinging plate for adjusting said setting gear, links holding said swinging plate always substantially parallel to a fixed line, keys for actuating said swinging plate, and registering mechanism adapted to be actuated by the setting gear.

22. In a calculating machine, the combination with a setting gear, and registering mechanism adapted to be actuated by said setting gear, of a removable section, a swinging plate mounted on the side of said section, means detachably connecting said swinging plate to the setting gear to move the same, and keys mounted in the said section to engage said swinging plate and variably actuate the same.

23. In a calculating machine, the combination with a setting gear adapted to be slid longitudinally of its axis, of a removable section, a swinging plate mounted on the side of said section, a slide plate mounted on said side of the section beneath the swinging plate, means detachably connecting said slide plate to the setting gear to move the same, links suspending said swinging plate one being extended having a slot-and-pin connection with the slide plate to cause said plates to move together, keys mounted in the said section for variably swinging said swinging plate, and registering mechanism adapted to be actuated by the setting gear.

24. In a calculating machine, a row of keys, a longitudinally movable plate with notches having inclined walls, a projection on each of said keys adapted to engage one inclined wall of a notch to move the plate and remain in such relation thereto that the other inclined wall will engage the projection to force the key upward when the plate is moved farther in the same direction.

25. In a calculating machine, a row of keys, a longitudinally movable plate with notches having opposite inclined walls, a projection on each of said keys adapted to engage one inclined wall of a notch to move the plate and remain in such relation thereto that the other inclined wall will engage the projection to force the key upward when the plate is moved in the opposite direction, a locking member for said row of keys adapted to lock them in depressed position, and means for releasing said locking member and for returning said plate to initial position near the close of an operation of the machine.

26. In a calculating machine, a swinging plate adapted to move endwise of itself as it swings, keys for variably swinging said plate, a slide plate connected to said swinging plate to move endwise therewith, a setting gear adapted to be positioned by said slide plate, and registering mechanism.

27. In a calculating machine, a swinging plate adapted to move endwise of itself as it swings, keys for variably swinging said plate, a setting gear connected to said swinging plate so as to be positioned by the said endwise movement thereof, and registering mechanism.

28. In a calculating machine, the combination with a setting gear, and registering mechanism adapted to be actuated by said setting gear, of a swinging plate adapted to swing in the direction of positioning of said gear, keys adapted to engage said swinging plate to swing the same, and means for transmitting movement from said swinging plate to said gear.

29. In a calculating machine, the combination with a setting gear, and registering mechanism adapted to be actuated by said setting gear, of a swinging plate adapted to swing in the direction of positioning of said gear and having between its ends a series of varying inclines, keys adapted to engage said inclines to swing the swinging plate, and means for transmitting movement from said swinging plate to said gear.

30. In a calculating machine, the combination with a setting gear, and registering mechanism adapted to be actuated by said setting gear, of a swinging plate adapted to swing in the direction of positioning of said gear, keys adapted to engage said swinging plate to swing the same, and a slide plate for transmitting movement from said swinging plate to said gear.

31. In a calculating machine, the combination with a setting gear, and registering mechanism adapted to be actuated by said setting gear, of a swinging plate adapted to swing endwise in the direction of positioning of said gear, keys for swinging said plate, means holding said plate always parallel to the direction of positioning of the setting gear, and means for transmitting movement from said swinging plate to said gear.

JOSEPH BLAUSTEIN.